United States Patent [19]

Shimura

[11] Patent Number: 5,280,522
[45] Date of Patent: Jan. 18, 1994

[54] CIRCUIT FOR TRANSMITTING VOICE SIGNALS AND DIAL PULSES

[75] Inventor: Tooru Shimura, Yokohama, Japan
[73] Assignee: Nitsuko Corporation, Kawasaki, Japan
[21] Appl. No.: 760,464
[22] Filed: Sep. 17, 1991
[30] Foreign Application Priority Data Sep. 17, 1990 [JP] Japan .................... 2-97478[U]

[51] Int. Cl.$^5$ .............................................. H04M 1/00
[52] U.S. Cl. ........................................ 379/359; 379/362; 379/387; 379/389
[58] Field of Search ............... 379/359, 362, 387, 364, 379/389

[56] References Cited

U.S. PATENT DOCUMENTS 5,105,461  4/1992  Tsurusaki et al. .............. 379/359 X Primary Examiner—James L. Dwyer
Assistant Examiner—Paul Fournier
Attorney, Agent, or Firm—Keck, Mahin & Cate

[57] ABSTRACT

A signal transmission circuit of a telephone system comprises a photo-transistor with its emitter and collector connected to telephone network lines, respectively. First and second relays are disposed, respectively, in the telephone network lines between a primary winding of a voice transformer and the collector and in a line between the base and the primary winding of the voice transformer. When a telephone call arises, the first relay connects the primary winding to the collector of the photo-transistor and disconnects a resistor, which is disposed between a junction of the primary winding and the second relay for connecting the base of the photo-transistor to the junction, from the primary winding so as to transmit voice signals through the voice transformer. When dialing is performed, the first relay is caused to disconnect the primary winding from the collector and connect the resistor to the primary winding, in a closed loop. The second relay disconnects the base from the junction so as to render the photo-transistor responsive to photo signals provided from the control means, thereby providing dial pulses the telephone network lines.

10 Claims, 3 Drawing Sheets

CIRCUIT FOR TRANSMITTING VOICE SIGNALS AND DIAL PULSES

The present invention relates to a circuit for transmitting voice signals and sending dial pulses between telephone network lines.

BACKGROUND OF THE INVENTION

For the purpose of providing a brief background of this kind of a voice signal and dial pulse transmitting circuit, which will enhance an understanding of the operation of the circuit of the present invention, reference is made to FIG. 1.

Shown in FIG. 1 is a conventional circuit for transmitting voice signals and sending dial pulses between telephone network lines, including a rectifier circuit 1, dial pulse transmission circuit 2, and telephone voice transmission circuit 3. The circuits 1, 2 and 3 are separately provided between telephone network lines L1 and L2 and are connected to the following circuit (not shown) via a voice transformer 4.

The dial pulse transmission circuit 2 has a photo-transistor PT having its collector and emitter connected to the telephone network lines L1 and L2, respectively, and a resistor R1 connected to the primary winding 4a of the voice transformer 4 via a two-way relay SR and a capacitor C so as to form a closed circuit when dialing is performed, the photo-transistor PT is made conductive and nonconductive (or turned ON and OFF), responding to instructions provided from a related control unit (which is well known in the art and not shown in FIG. 1). The photo-transistor transmits its signals in a known manner as dial signals between the telephone network lines.

The voice transmission circuit 3 has a transistor Tr with its collector and emitter connected to the telephone network lines L1 and L2, respectively. The transistor Tr is connected, at its base, to one terminal of a varistor VA, which, in turn, is connected at its other terminal to a junction of the primary winding 4a of the voice transformer 4 and a capacitor C.

In the above circuit, during a call, the two-way relay SR is in contact with a first contact a so as to render the transistor TR operative and to render the photo-transistor PT nonconductive. During dialing, the two-way relay SR is in contact with another, second, contact b so as to allow the photo-transistor PT to turn conductive and nonconductive, or ON and OFF. Responding to the ON-OFF operation of the photo-transistor PT, dial pulses are provided and transmitted to the telephone network line.

The known circuit described above renders the photo-transistor PT useless while the transistor Tr is utilized during a call and the transistor Tr useless while the photo-transistor PT is utilized during dialing. Thus, it can be said that the prior art circuit is provided with two separate circuit parts which perform almost the same function. This results not only in a cost increase but also in a complicated circuit structure.

SUMMARY OF THE INVENTION

It is, therefore, a primary object of the present invention to provide a circuit for transmitting voice signals and dial pulses in which the number of structural electric parts or elements is reduced. This not only helps to decrease costs but also simplifies the circuit structure.

The above object of the present invention is accomplished by providing a particularly constructed signal transmission circuit of a telephone system for sending dial pulses to telephone network lines, based on control signals from a control unit, and for transmitting voice signals to and from the telephone network lines. The signal transmission circuit includes a photo-transistor means with its emitter and collector connected to the telephone network lines and with its base connected to the emitter through a resistor, a series circuit of a primary winding of the transformer, and a capacitor, which is connected between the emitter and collector of the photo-transistor. First relay means is disposed in the telephone network line between the primary winding and the collector for connecting and disconnecting the primary winding from the collector of the photo-transistor, and second relay means is disposed between the base and the junction for connecting and disconnecting the base from the junction.

When a telephone call is received, the control means causes a first relay means to connect the primary winding to the collector of the photo-transistor and disconnect the resistor, which is disposed between a junction of the primary winding and the second relay means. The base is connected to the junction so as to transmit voice signals through the voice transformer. On the other hand, when dialing is performed, the control means causes the first relay means to disconnect the primary winding from the collector and connect the resistor to the primary winding, in a closed loop, and the second relay means to disconnect the base from the junction so as to render the photo-transistor responsive to photo signals provided from the control means. Dial pulses to the telephone network line are thereby provided.

The photo-transistor, having a switching feature, being one element of the photo-coupler means, is thus utilized in both a circuit for receiving a telephone call and a circuit for dialing. The function performed by the photo-transistor is changed by the relay means. This utilization of the photo-transistor permits the circuit to be made with a reduced number of electric components.

BRIEF DESCRIPTION OF THE DRAWINGS

The above and other objects and features of the present invention will become apparent from the following description of a preferred embodiment thereof when considered in conjunction with the accompanying drawings, wherein similar reference numerals have been used to designate the same or similar elements, and in which.

DETAILED DESCRIPTION OF THE PREFERRED EMBODIMENT

Figure 1:
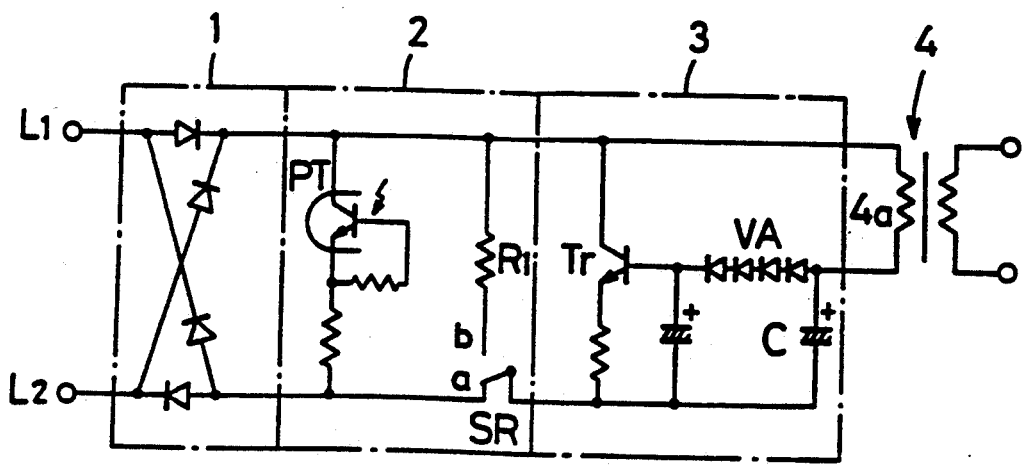
FIG. 1, as noted above, is a diagram showing a prior art circuit for transmitting voice signals and dial pulses.
Figure 2:
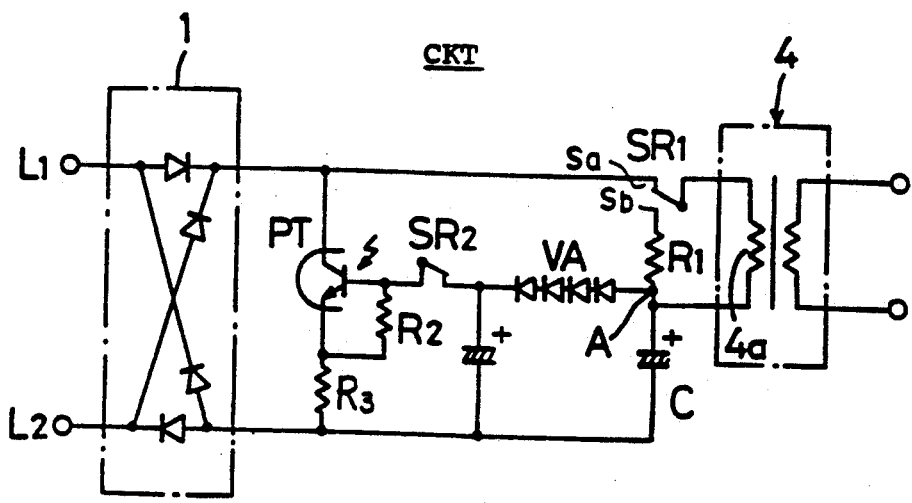
FIG. 2 is a diagram showing a circuit for transmitting voice signals and dial pulses in accordance with a preferred embodiment of the present invention.

Referring to the drawings in detail and, in particular, to FIG. 2, a voice signal and dial pulse transmission circuit CKT, in accordance with a preferred embodiment of the present invention, is shown. The circuit includes a photo-transistor PT with its collector and emitter connected to telephone network lines L1 and L2, respectively, following a rectifier circuit 1. The emitter and base of the photo-transistor PT are connected to each other via a resistor R2. When dialing is performed, the photo-transistor PT is turned conductive and nonconductive, or operated ON and OFF, in response to control signals, such as light signals, provided from a related control unit (which is well known in the art and not shown in FIG. 2), and transmits pulses as dial signals to the telephone network line. The photo-transistor PT is connected via the base with a one-way relay SR2. The photo-transistor PT is further connected between the collector and emitter, namely, between telephone network lines L1 and L2, to a series circuit including a primary winding 4a of a voice transformer 4 and a capacitor C via a two-way relay SR1.

A resistor R1, which leads from a junction A between the primary winding 4a of the voice transformer 4 and the capacitor C, can be connected to and disconnected from the primary winding 4a of the voice transformer 4 by the two-way relay SR1. The one-way relay SR2 and a varistor VA are connected in series between the base of the photo-transistor PT and the junction A between the primary winding 4a of the voice transformer 4 and the condenser C.

It is to be noted that during a call, the two-way relay SR1 is in contact with a contact Sa in order to connect the collector of the photo-transistor PT to the primary winding 4a of the voice transformer 4. The one-way relay SR2 remains closed at this time. During dialing, the two-way relay SR1 is in contact with a contact Sb in order to form a closed circuit including the primary winding 4a of the voice transformer 4 and the resistor R1. The one-way relay SR2 remains open at this time.

When dialing occurs, the two-way relay SR1 changes over to close the contact Sb to form the closed circuit including the primary winding 4a of the voice transformer 4 and the resistor R1. The one-way relay SR2 opens. When the relays SR1 and SR2 are in the positions taken during dialing, the photo-transistor PT receives control light signals emanating from the control unit and provides rectangular pulses to the telephone network line corresponding to the control light signals. On the other hand, during a conversation, the two-way relay SR1 changes over and closes the contact Sa to connect the collector of the photo-transistor PT to the primary winding 4a of the voice transformer 4. At this time, the one-way relay SR2 closes. In the conversation state of the relays SR1 and SR2, the photo-transistor PT operates as a normal transistor. Accordingly, a current circuit is formed through a path from the telephone network line L1 to the line L2 via the photo-transistor PT and then the resistor R3 for a call, so that voice signals are transmitted to the following circuit via the voice transformer 4.

Figure 3A:
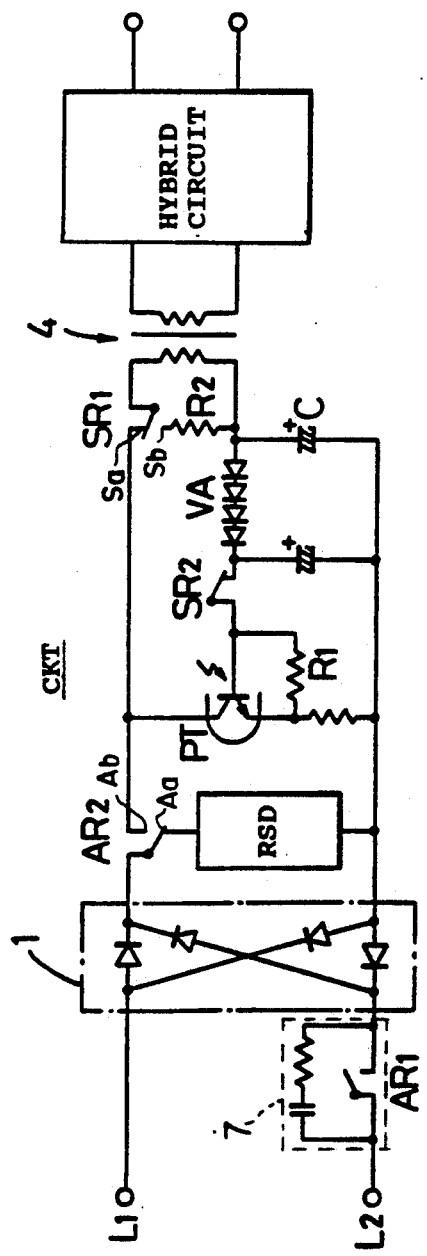
FIGS. 3A and 3B are diagrams showing the circuit for transmitting voice signals and dial pulses of FIG. 2 as used in a telephone line interface device.
Figure 3B:
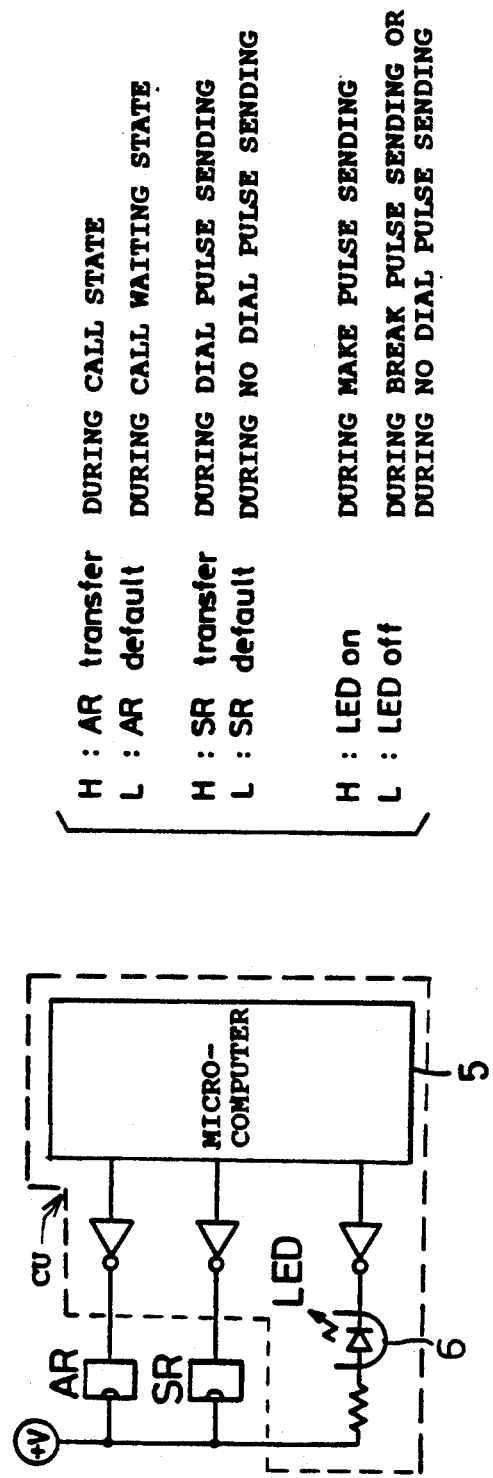

Referring to FIG. 3A, the voice signal and dial pulse transmission circuit CKT shown in FIG. 2, which is embodied in a telephone line interface device and cooperates with a control unit CU shown in FIG. 3B, is shown. The circuit further comprises a one-way relay AR1 disposed in the telephone network line L2 before the rectifier I and a two-way relay AR2 disposed in the telephone network line L1 following the rectifier 1. A ringing signal detector circuit RSD, which is well known in the art and readily available, is disposed between the telephone network lines L1 and L2 and is connected to and disconnected from the telephone network line L1 by the two-way relay AR2.

The control unit CU comprises a general purpose microcomputer 5 and a light emitting diode (LED) 6, serving as an photo-electric element of a photo-coupler in cooperation with the photo-transistor PT. The microcomputer 5 controls the relay AR (which is shown as representing both of the relays AR1 and AR2) and the relay SR (which is shown as representing both of the relays SR1 and SR2) as well as the light emitting diode (LED) 6.

The relay AR (relays AR1 and AR2) is controlled by the microcomputer 5 in such a way as to remain in the position shown in FIG. 3A in an idle state and to change over to another position upon the occurrence of a call. It will be recalled from the above description of FIG. 2 that the relay SR (relays SR1 and SR2) is controlled by the microcomputer in such a way as to remain in the position shown in FIG. 3A in all states other than dialing and to change over to another positions during dialing. Further, the light emitting diode 6 is controlled by the microcomputer 5 to flash on and off during dialing and to remain unlit in all states other than dialing.

Figure 4A:
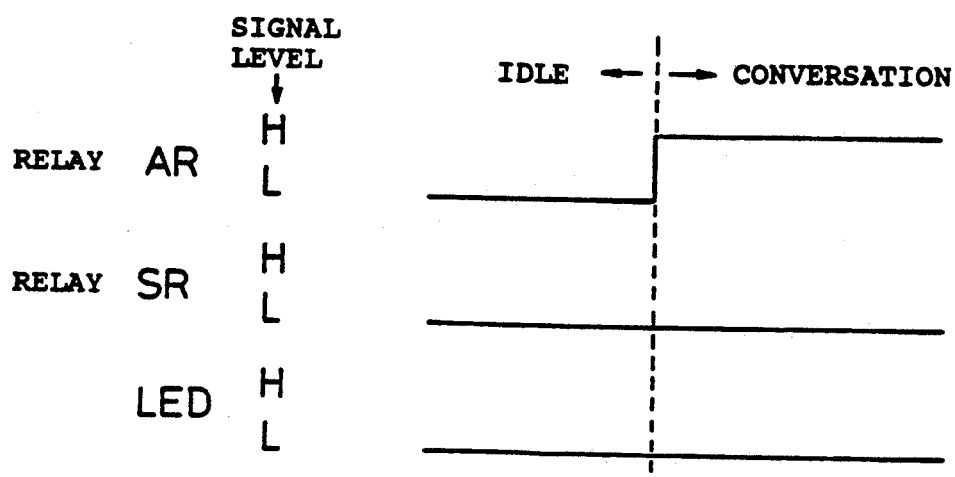
FIG. 4A is a time chart of the operations of circuit elements when receiving a call.
Figure 4B:
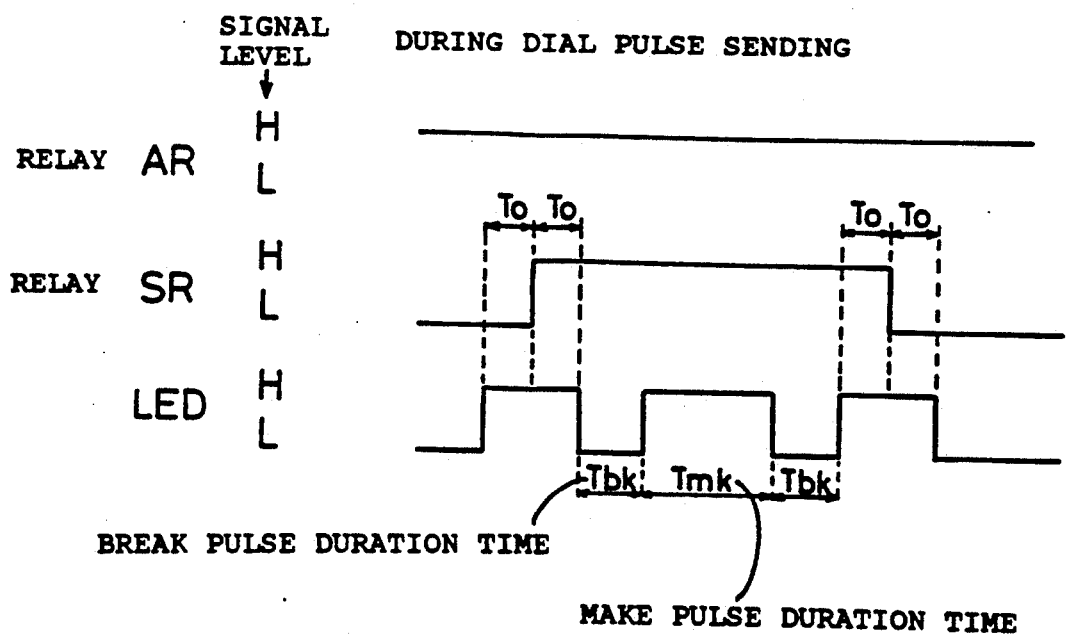
FIG. 4B is a time chart of the operations of circuit elements during dialing.

The operation of the voice signal and dial pulse transmission circuit CKT shown in FIGS. 3A and 3B is best understood by reviewing FIGS. 4A and 4B, which are time charts of operations of the relays AR (AR1 and AR2) and SR (SR1 and SR2) and the light emitting diode (LED) 6.

When a call arises in the idle state, as is shown in FIG. 4A, the microcomputer 5 changes its output, as a control signal to the relay AR (each of the relays AR1 and AR2), from a low level (L) to a high level (H), so as to change over the relay AR. That is, the one-way relay AR1 closes to short circuit the C-R circuit 7 and the two-way relay AR2 changes over to the contact Ab so as to disconnect the ringing signal detector circuit RSD from the telephone network line L1. The microcomputer 5, however, maintains its outputs, as control signals to the relay SR (each of the relays SR1 and SR2), at a low level (L), so as to maintain the relay SR in the state shown in FIG. 3A and the photo-transistor PT inoperative.

During dialing, as is shown in FIG. 4B, the microcomputer 5 provides a high level (H) control signal to the relay SR (SR1 and SR2) while maintaining the control signal to the relay AR (AR1 and AR2) at a high level, so as to change over the relay SR (SR1 and SR2) to another position from the position shown in FIG. 3A and to keep the relay AR (AR1 and AR2) changed over to the other position from the position shown in FIG. 3A. Simultaneously, the microcomputer 5 provides the light emitting diode (LED) 6 with a high level, make signal pulse and a low level, break signal pulse at a predetermined cycle so as to cause the light emitting diode (LED) 6 to flash on and off. The light emitting diode (LED) 6 emits light for the duration of a make signal pulse and no light for the duration of a brake signal pulse, which is defined between adjacent pairs of make signal pulses. Responding to the make-brake signal pulses, the light emitting diode (LED) 6 emits intermittent light pulses, so as to repeatedly make the photo-transistor PT conductive and nonconductive, thereby providing dialing pulses.

As is shown in FIG. 4B, in order for the voice signal and dial pulse transmission circuit CKT to avoid an incorrect break pulse, the microcomputer 5 provides the light emitting diode (LED) 6 with a make signal pulse which appears a predetermined time To ahead of the change of the control signal, sent to the relay SR, from a low level to a high level. The make signal pulse disappears a predetermined time To after the change of the control signal to the relay SR from a high level to a low level.

According to the present invention, in the voice signal and dial pulse transmission circuit CKT, a transistor, which is essential in the conventional voice transmission circuit, is eliminated. The elimination of this transistor reduces the cost and increases the packaging density of the voice signal and dial pulse transmission circuit CKT.

It is to be understood that although the present invention has been described in detail with respect to a preferred embodiment thereof, various other embodiments and variants may occur to those skilled in the art which fall within the scope and spirit of the invention. Such other embodiments and variants are intended to be covered by the following claims.

What is claimed is:

1. A circuit of a telephone system for providing dial pulses to telephone network lines and for communicating voice signals between the telephone network lines and the circuit, said circuit being connected to a voice transformer and comprising:

a photo-transistor having an emitter and a collector connected to the telephone network lines, respectively, and a base connected to said emitter through a resistor;

a series circuit including a primary winding of said transformer and a capacitor, said series circuit being connected to said emitter and collector;

a resistor disposed between a junction of said primary winding and said capacitor and one of said telephone network lines;

first relay means, disposed in one of said telephone network lines between said primary winding and said collector, for connecting said primary winding to and disconnecting said primary winding from said collector;

second relay means, disposed between said base and said junction, for connecting said base to and disconnecting said base from said junction; and control means for causing said first relay means to connect said primary winding to said collector and disconnect said resistor from said telephone network line and said second relay means to connect said base to said junction so as to transmit voice signals through said voice transformer during a conversation, and causing said first relay means to disconnect said primary winding from said collector and connect said resistor to said primary winding in a closed loop and said second relay means to disconnect said base from said junction so as to render said photo-transistor responsive to photo signals provided from said control means during dialing, thereby providing dial signals to one of said telephone network lines.

2. A circuit as recited in claim 1, further comprising a resistor disposed between said emitter and said capacitor.

3. A circuit as recited in claim 1, further comprising a varistor disposed between said second relay means and said junction in series with respect to said second relay means.

4. A circuit as recited in claim 1, wherein said first relay means comprises a two-way electronic relay controlled by said control means.

5. A circuit as recited in claim 1, wherein said second relay means comprises an electronic relay controlled by said control means.

6. A circuit as recited in claim 1, wherein said control means includes light emitting means for emitting light pulses corresponding to a dialed number.

7. A circuit as recited in claim 6, wherein said light emitting means comprises a light emitting diode.

8. A circuit as recited in claim 7, wherein said first and second relay means are turned on with a predetermined time delay after a first one of said light pulses and turned off with a predetermined time delay after a last one of said light pulses.

9. A circuit as recited in claim 1, wherein said first relay means and said collector are connected via a junction disposed in a first one of said telephone network lines in which said first relay means is disposed, and further comprising ringing signal detecting means for detecting an incoming call, said ringing signal detecting means being disposed between said first one of said telephone network lines and a further one of said telephone network lines, and third relay means disposed in said first one of said telephone network lines and being connected to said first relay means and said collector via said junction, said third relay means being for maintaining said ringing signal detecting means in connection with said first one of said telephone network lines until said ringing signal detecting means detects an incoming call, and disconnecting said ringing signal detecting means from said first one of said telephone network lines after said ringing signal deciding means detects an incoming call.

10. A circuit as recited in claim 9, wherein said third relay means comprises a two-way electronic relay controlled by said control means.

* * * * *